United States Patent [19]

Scholz et al.

[11] Patent Number: 6,028,179

[45] Date of Patent: Feb. 22, 2000

[54] TRISAZO DYES

[75] Inventors: Gerhard Scholz, Hochdorf-Assenheim; Gunther Lamm, Hassloch, both of Germany

[73] Assignee: BASF Aktiengesellschaft, Ludwigshafen, Germany

[21] Appl. No.: 09/147,107

[22] PCT Filed: Apr. 1, 1997

[86] PCT No.: PCT/EP97/01616

§ 371 Date: Oct. 5, 1998

§ 102(e) Date: Oct. 5, 1998

[87] PCT Pub. No.: WO97/38052

PCT Pub. Date: Oct. 16, 1997

[30] Foreign Application Priority Data

Apr. 3, 1996 [DE] Germany ............ 196 13 315

[51] Int. Cl.[7] .................................. C09B 29/00
[52] U.S. Cl. ........................................ 534/668
[58] Field of Search ................. 534/668, 677, 534/680, 684, 685

[56] References Cited

U.S. PATENT DOCUMENTS

| | | | |
|---|---|---|---|
| 2,220,397 | 11/1940 | Crossley et al. | 534/684 |
| 2,259,734 | 10/1941 | Crossley et al. | 534/684 X |
| 2,259,735 | 10/1941 | Crossley et al. | 534/684 |
| 2,259,736 | 10/1941 | Crossley et al. | 534/684 X |
| 5,270,455 | 12/1993 | Schlesinger | 534/684 |

FOREIGN PATENT DOCUMENTS

| | | |
|---|---|---|
| 0 068 245 | 1/1983 | European Pat. Off. . |
| 34 28 836 | 2/1985 | Germany . |
| 22 38 159 | 8/1972 | United Kingdom . |
| 81/03179 | 11/1981 | WIPO . |

*Primary Examiner*—Fiona T. Powers
*Attorney, Agent, or Firm*—Oblon, Spivak, McClelland, Maier & Neustadt, P.C.

[57] ABSTRACT

Trisazo dyes of the general formula I

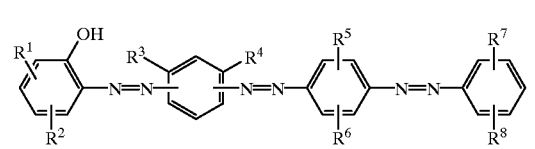

where $R^1$ is hydrogen, $C_1$–$C_4$-alkyl, halogen, nitro, hydroxysulfonyl, sulfamoyl, mono- or di-$C_1$–$C_4$-alkylsulfamoyl, $C_1$—$C_4$-alkylsulfonyl or $C_1$–$C_4$-alkoxysulfonyl, $R^2$ is hydrogen, halogen, nitro or hydroxysulfonyl, at least one of $R^1$ and $R^2$ being nitro, $R^3$ and $R^4$ are each independently of the other hydroxyl or amino, $R^5$ is hydrogen, $C_1$–$C_4$-alkyl, hydroxysulfonyl, sulfamoyl, mono- or di-$C_1$–$C_4$-alkylsulfamoyl, $C_1$–$C_4$-alkylsulfonyl, $C_1$–$C_4$-alkoxysulfonyl or carboxyl, $R^6$ is hydrogen or $C_1$–$C_4$-alkyl, $R^7$ is hydrogen, $C_1$–$C_4$-alkyl, hydroxysulfonyl, sulfamoyl, mono- or di-$C_1$–$C_4$-alkylsulfamoyl, $C_1$–$C_4$-alkylsulfonyl, $C_1$–$C_4$-alkoxysulfonyl, $SO_2N(CH_2COOH)_2$ or carboxyl, $R^8$ is hydrogen, $C_1$–$C_4$-alkyl, hydroxyl, $C_1$–$C_4$-alkoxy, halogen or nitro, with the proviso that at least one of $R^5$ and $R^7$ is COOH or $SO_3H$ and when $R^5$ or $R^7$ is $SO_3H$ the other is COOH, or $R^3$ and/or $R^4$ are each amino or $R^1$ is hydrogen or $R^6$ is alkyl, in free form or as transition metal complexes, are useful for dyeing leather, textile fibers and paper.

10 Claims, No Drawings

TRISAZO DYES

The present invention relates to trisazo dyes of the general formula I

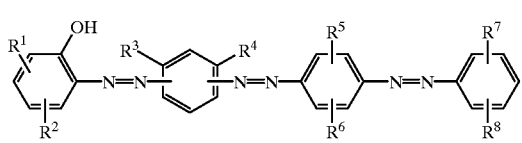

where

R$^1$ is hydrogen, C$_1$–C$_4$-alkyl, halogen, nitro, hydroxysulfonyl, sulfamoyl, mono- or di-C$_1$–C$_4$-alkylsulfamoyl, C$_1$–C$_4$-alkylsulfonyl or C$_1$–C$_4$-alkoxysulfonyl, R$^2$ is hydrogen, halogen, nitro or hydroxysulfonyl, at least one of R$^1$ and R$^2$ being nitro, R$^3$ and R$^4$ are each independently of the other hydroxyl or amino, R$^5$ is hydrogen, C$_1$–C$_4$-alkyl, hydroxysulfonyl, sulfamoyl, mono- or di-C$_1$–C$_4$-alkylsulfamoyl, C$_1$–C$_4$-alkylsulfonyl, C$_1$–C$_4$-alkoxysulfonyl or carboxyl, R$^6$ is hydrogen or C$_1$–C$_4$-alkyl, R$^7$ is hydrogen, C$_1$–C$_4$-alkyl, hydroxysulfonyl, sulfamoyl, mono- or di-C$_1$–C$_4$-alkylsulfamoyl, C$_1$–C$_4$-alkylsulfonyl, C$_1$–C$_4$-alkoxysulfonyl, SO$_2$N(CH$_2$COOH)$_2$ or carboxyl, R$^8$ is hydrogen, C$_1$–C$_4$-alkyl, hydroxyl, C$_1$–C$_4$-alkoxy, halogen or nitro, with the proviso that at least one of R$^5$ and R$^7$ is COOH or SO$_3$H and when R$^5$ or R$^7$ is SO$_3$H the other is COOH, or R$^3$ and/or R$^4$ are each amino or R$^1$ is hydrogen or R$^6$ is alkyl, in free form or as transition metal complexes, and to their use for dyeing leather, textile fibers and paper.

Acid trisazo dyes which produce brown hues are well known and are used for example for dyeing leather, textiles and paper (see for example DE-A-22 38 159, U.S. Pat. No. 2,259,734 and WO 81/03179). The dyes were used either in free form or in the form of metal complexes, especially as copper complexes.

However, the known dyes leave something to be desired as regards their lightfastness, washfastness and perspiration fastness and their dyeing behavior, for example as regards the degree of liquor exhaustion.

It is an object of the present invention to provide novel trisazo dyes which are superior to the known dyes as regards lightfastness, washfastness and perspiration fastness and/or dyeing behavior.

We have found that this object is achieved by the trisazo dyes of the general formula I mentioned at the beginning.

Suitable R$^1$, R$^5$, R$^6$, R$^7$ and R$^8$ include for example the C$_1$–C$_4$-alkyl radicals methyl, ethyl, n-propyl, isopropyl, n-butyl, isobutyl, sec-butyl and tert-butyl. Methyl is preferred.

Suitable R$^1$, R$^5$ and R$^7$ include for example mono- or di-C$_1$–C$_4$-alkylsulfamoyl radicals, C$_1$–C$_4$-alkylsulfonyl radicals and C$_1$–C$_4$-alkoxysulfonyl radicals with the alkyl radicals mentioned.

Suitable R$^8$ includes for example C$_1$–C$_4$-alkoxy radicals with the alkyl groups mentioned.

Suitable R$^1$, R$^2$ and R$^8$ include the halogens fluorine, chlorine, bromine and iodine, preferably chlorine and bromine.

Preferred R$^1$ and R$^2$ are hydrogen, hydroxysulfonyl and nitro, in particular hydrogen and nitro, at least one of the radicals R$^1$ or R$^2$, preferably both, being nitro. R$^1$ and R$^2$ are each preferably disposed meta to the diazo group.

R$^3$ and R$^4$ are preferably identical. The diazo groups coupled to the same phenyl ring are both preferably disposed ortho to them, resulting in a 1,2,4,5-substituted phenyl ring.

Preferred R$^5$ is COOH, SO$_3$H, methyl and hydrogen, of which carboxyl is particularly preferred.

Preferred R$^6$ is hydrogen and methyl. Hydrogen is the preferred R$^6$ in combination with COOH, SO$_3$H or hydrogen as R$^5$. R$^6$ is preferably methyl when R$^5$ is methyl too.

Preferred R$^7$ is SO$_3$H and COOH.

Particularly preferred dyes are those in which either R$^5$ or R$^7$ is carboxyl.

Preferred R$^8$ is hydrogen, methyl and hydroxyl.

The trisazo dyes of the present invention can be used in the free form or in the form of their metal salts.

Suitable transition metals for complexing with the trisazo dyes are in particular the elements of subgroups 6, 7 and 8 of the periodic table and also copper, especially chromium, iron, cobalt, nickel and copper, and iron complexes are particularly preferred.

Particular preference is given to the iron complexes of the following trisazo dyes, which are obtained by reacting one mol equivalent of dye with 0.5 to 2 mol equivalents of iron salt:

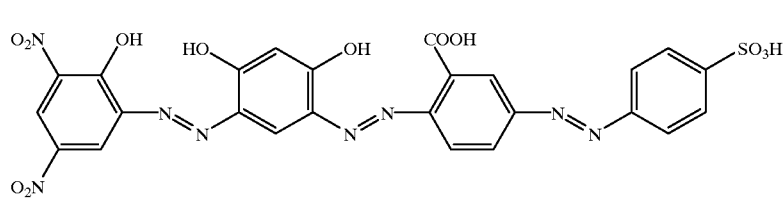

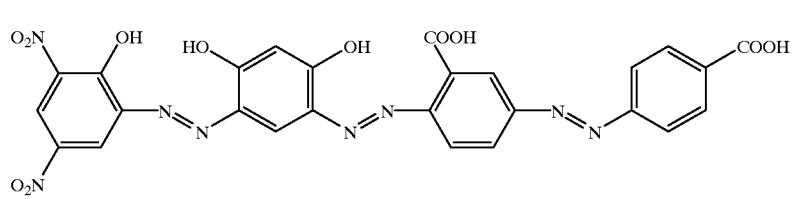

-continued

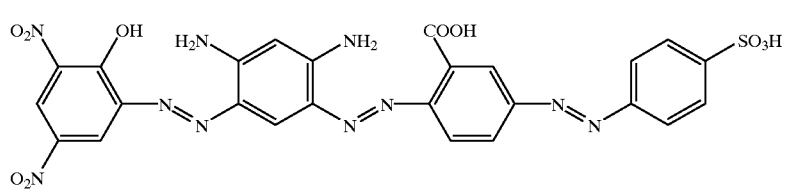

Ic

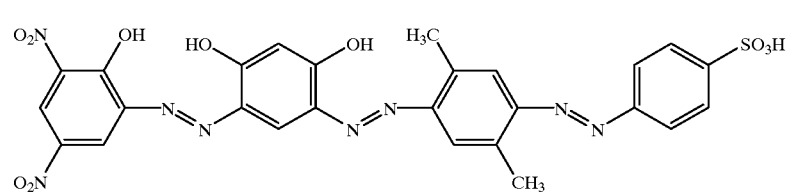

Id

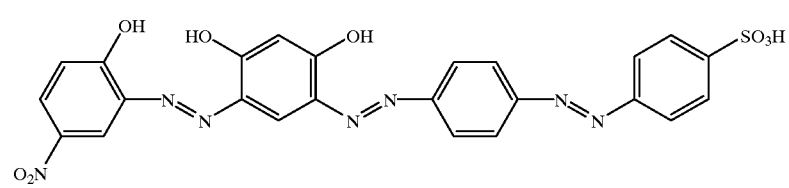

Ie

Preference is given to iron complexes of the dyes Ia–d with a 1:1 stoichiometry and to the iron complexes of the dyes Ia and b with a 2:1 stoichiometry of the starting materials (iron salt/dye).

Suitable iron salts are water-soluble iron(II) salts such as iron(II) chloride, iron(II) sulfate, iron(II) carbonate and iron(II) acetate and preferably iron(III) salts such as iron(III) sulfate, iron(III) chlorate, iron(III) nitrate and especially iron(III) chloride.

The dyes of the formula I can be prepared in a conventional manner, for example by diazotizing an aminophenol of the general formula II

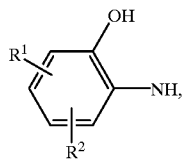

II where $R^1$ and $R^2$ are each as defined above, and coupling with a compound of the general formula III

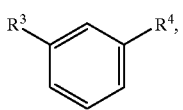

III where $R^3$ and $R^4$ are each as defined above. The resulting monoazo compound IV

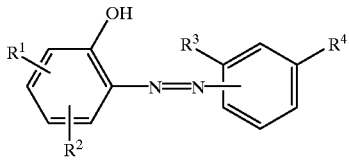

IV is reacted with the diazonium salt of an amino component V

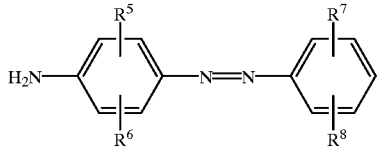

V where $R^5$, $R^6$, $R^7$ and $R^8$ are each as defined above, to obtain the dyes of the general formula I.

The aminoazo compounds V are obtained for example by reacting the diazonium salt of an amine VI

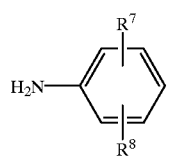

VI with a compound VII

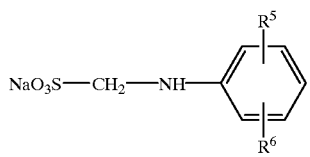

and subsequent hydrolysis of the resulting monoazo compound to the aminoazo compound V.

The order of the coupling reactions can also be changed. The optionally subsequent metallization of the trisazo dye is effected by known methods.

The dyes of the present invention are notable for high lightfastness, good washfastness and perspiration fastness properties, especially with respect to discolorations of cotton fabrics, and good dyeing properties, for example good liquor exhaustion, in the case of leather dyeings.

The dyes are particularly suitable for dyeing leather, textile fibers and paper. Any kind of leather can be dyed, such as grain and suede leather, chrome leather, retanned leather or velour leather from goat, sheep, cow and pig. Of the textile fibers, cotton, wool and polyamide fibers are particularly suitable.

EXAMPLES

Example 1
Preparation of the trisazo dye

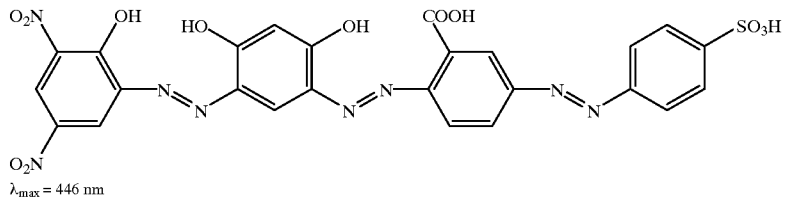

$\lambda_{max} = 446$ nm a) 25 g (0.182 mol) of sodium formaldehyde bisulfite were dissolved in 6 ml of water at 50° C. 14.3 g (0.104 mol) of anthranilic acid were added to the solution. The mixture was stirred at 95° C. for 4 hours. 17.3 g (0.1 mol) of sulfanilic acid first diazotized in a conventional manner were then added at 25° C. while the pH was held at 6.0 with sodium bicarbonate. The mixture was subsequently stirred at 0–5° C. for 3 hours. 25 ml of 50% strength by weight sodium hydroxide were then added, and the mixture was heated at 90° C. for 4 hours. After cooling to 20° C., the pH was adjusted to 4.0 with hydrochloric acid, the suspension was subsequently stirred for 2 hours, and the product was filtered off with suction.

b) 22.1 g (0.1 mol) of sodium picramate were diazotized in a conventional manner and coupled with 10.4 g (0.095 mol) of resorcinol at pH 9.0. The diazonium salt of 32.1 g (0.1 mol) of the product of a) was added to the suspension at pH 8–9. After the coupling had ended, the pH was adjusted to 6.0 with dilute hydrochloric acid. 16.1 g (0.1 mol) of anhydrous iron(III) chloride were then added at 60° C., and the mixture was stirred at pH 4.0 for 1 hour. The precipitated trisazo dye was filtered off with suction and dried at 60° C., giving 136 g of an NaCl- comprising solid.

Iron complexes of the dyes listed in the following table taking x mol equivalent of iron and y mol equivalents of dye as the starting point were prepared in a similar manner: x:y

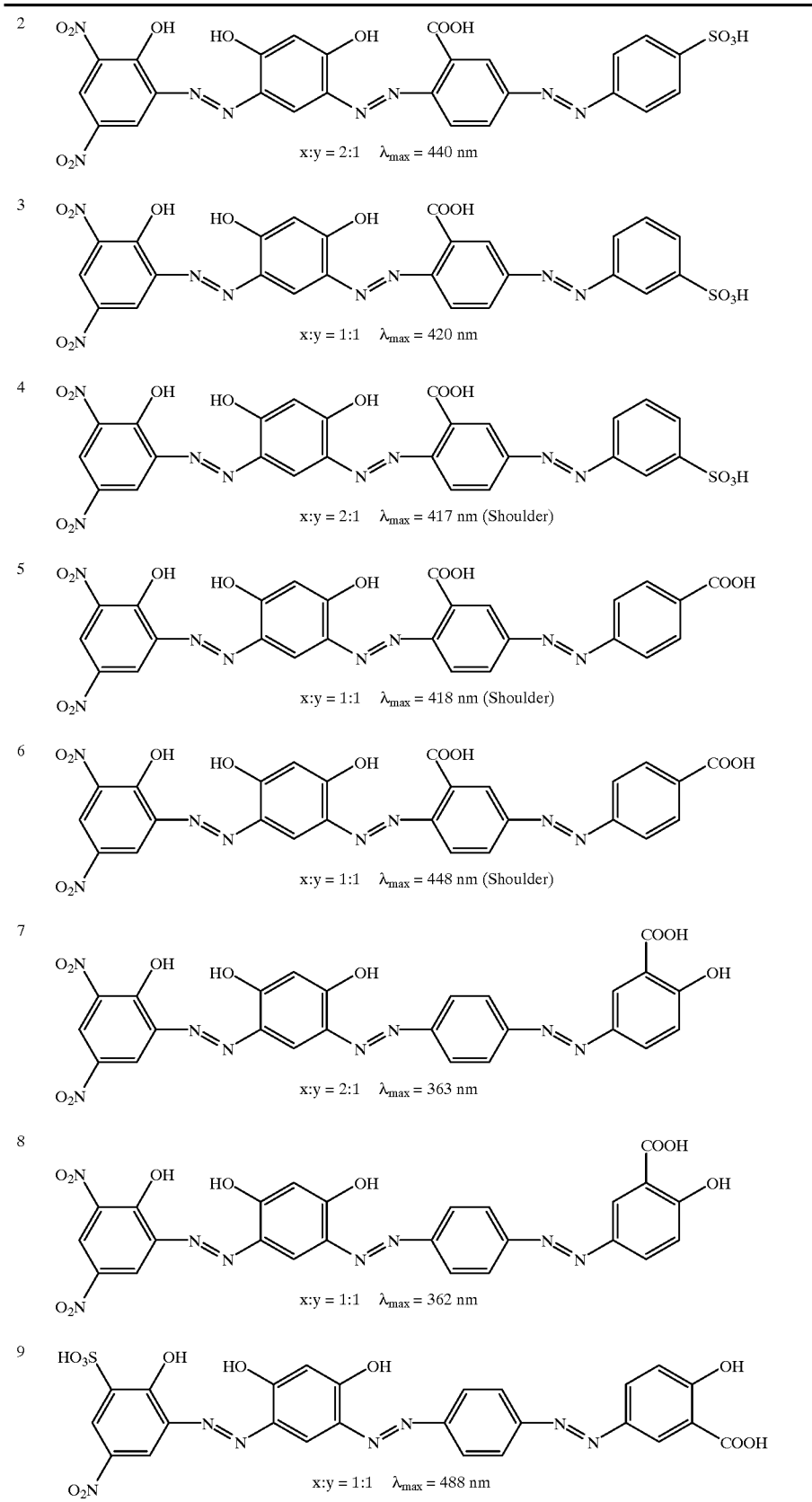

-continued
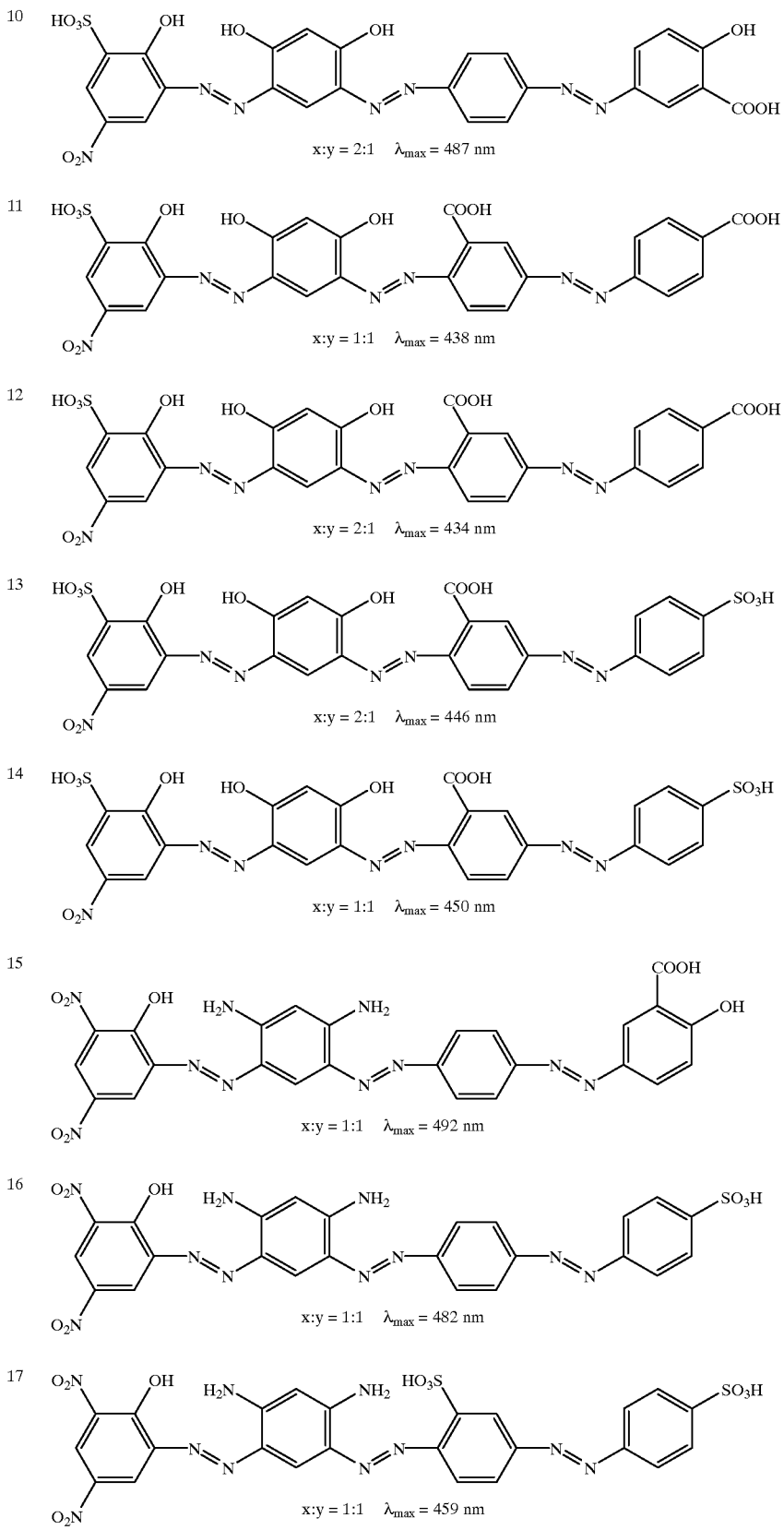

-continued
18
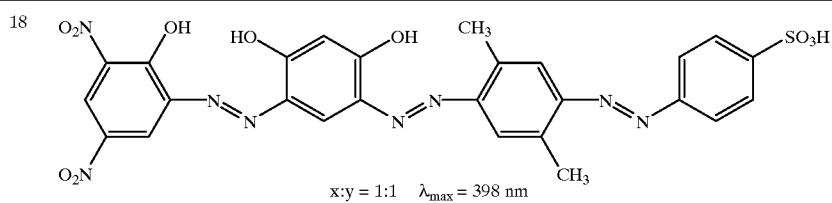
x:y = 1:1   $\lambda_{max}$ = 398 nm
19
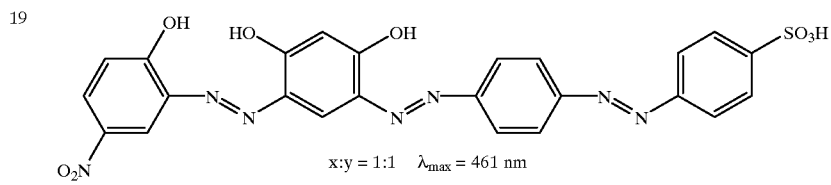
x:y = 1:1   $\lambda_{max}$ = 461 nm
20
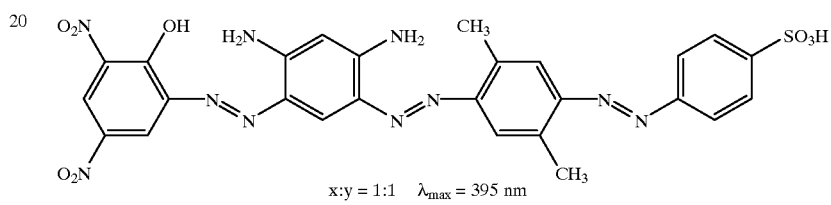
x:y = 1:1   $\lambda_{max}$ = 395 nm
21
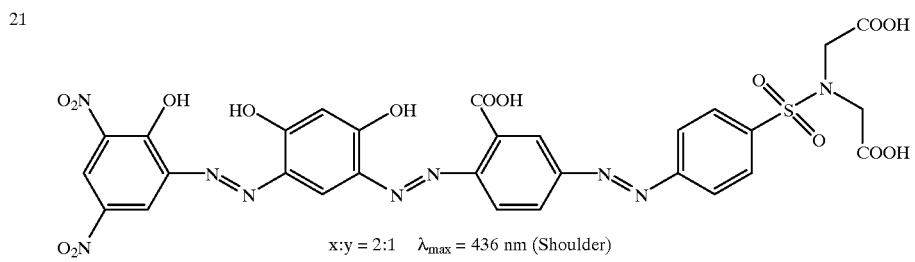
x:y = 2:1   $\lambda_{max}$ = 436 nm (Shoulder)
22
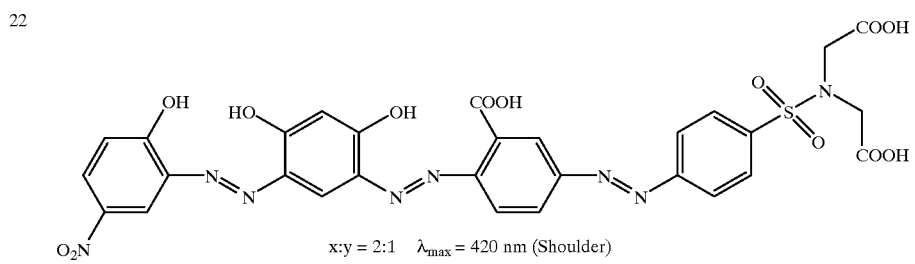
x:y = 2:1   $\lambda_{max}$ = 420 nm (Shoulder)
23
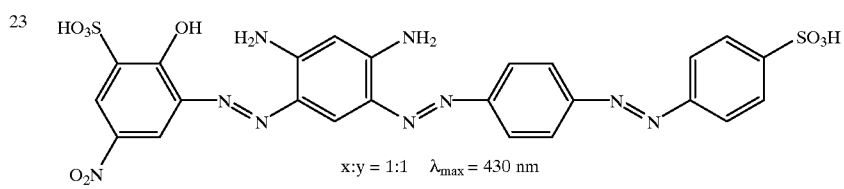
x:y = 1:1   $\lambda_{max}$ = 430 nm
24
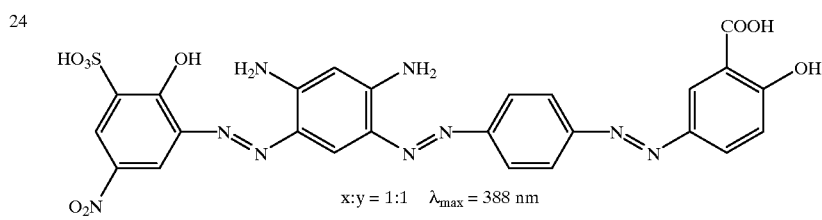
x:y = 1:1   $\lambda_{max}$ = 388 nm -continued

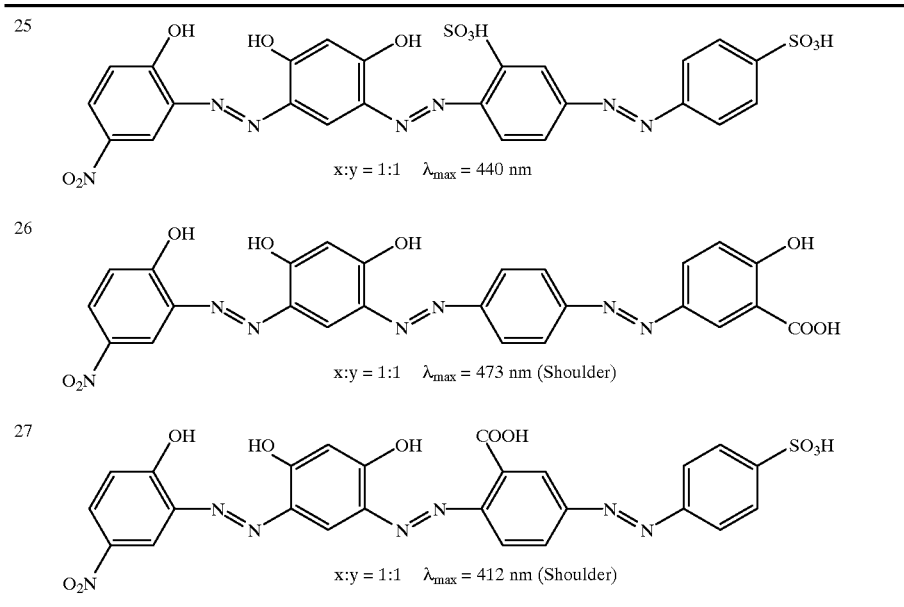

We claim:
1. A trisazo dye of the general formula I

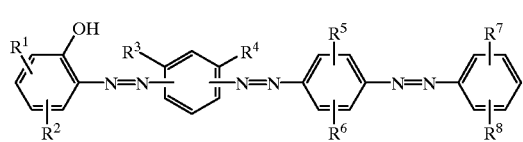

where
$R^1$ is hydrogen, $C_1$–$C_4$-alkyl, halogen, nitro, hydroxysulfonyl, sulfamoyl, mono- or di-$C_1$–$C_4$-alkylsulfamoyl, $C_1$–$C_4$-alkylsulfonyl or $C_1$–$C_4$-alkoxysulfonyl,
$R^2$ is hydrogen, halogen, nitro or hydroxysulfonyl, at least one of $R^1$ and $R^2$ being nitro,
$R^3$ and $R^4$ are each independently of the other hydroxyl or amino,
$R^5$ is hydrogen, $C_1$–$C_4$-alkyl, hydroxysulfonyl, sulfamoyl, mono- or di-$C_1$–$C_4$-alkylsulfamoyl, $C_1$–$C_4$-alkylsulfonyl, $C_1$–$C_4$-alkoxysulfonyl or carboxyl,
$R^6$ is hydrogen or $C_1$–$C_4$-alkyl,
$R^7$ is hydrogen, hydroxysulfonyl, sulfamoyl, mono- or di-$C_1$–$C_4$-alkylsulfamoyl, $C_1$–$C_4$-alkylsulfonyl, $C_1$–$C_4$-alkoxysulfonyl, $SO_2N(CH_2COOH)_2$ or carboxyl, $R^8$ is hydrogen, hydroxyl, $C_1$–$C_4$-alkoxy, halogen or nitro, with the proviso that at least one of $R^5$ and $R^7$ is COOH or $SO_3H$ and when $R^5$ or $R^7$ is $SO_3H$ the other is COOH, or $R^3$ and/or $R^4$ are each amino or $R^1$ is hydrogen or $R^6$ is alkyl, in free form or in the form of a metal salt or as a transition metal complex.

2. The trisazo dye of the formula I as claimed in claim 1, wherein $R^1$ is nitro and $R^2$ is nitro or hydrogen.

3. The trisazo dye of the formula I as claimed in claim 1, wherein $R^5$ is COOH, $SO_3H$, methyl or hydrogen.

4. The trisazo dye of the formula I as claimed in claim 1, wherein $R^6$ is hydrogen or methyl.

5. The trisazo dye of the formula I as claimed in claim 1, wherein $R^7$ is $SO_3H$ or COOH.

6. The trisazo dye of the formula I as claimed in claim 1, wherein $R^5$ or $R^7$ is COOH.

7. The trisazo dye of the formula I as claimed in claim 1, wherein $R^8$ is hydrogen or hydroxyl.

8. The trisazo dye of the formula I as claimed in claim 1, as a copper, chromium, iron, cobalt or nickel complex.

9. The trisazo dye of the formula I as claimed in claim 1, as an iron complex.

10. A method for dyeing leather, a textile fiber or paper, comprising applying thereto a trisazo dye of claim 1.

* * * * *